United States Patent
Christopher et al.

(10) Patent No.: US 9,954,954 B2
(45) Date of Patent: Apr. 24, 2018

(54) SYSTEM AND METHOD FOR MAKING LEGACY DEVICE INTERNET OF THINGS (IOT) AWARE

(71) Applicant: AMERICAN MEGATRENDS, INC., Norcross, GA (US)

(72) Inventors: Samvinesh Christopher, Suwanee, GA (US); Joseprabu Inbaraj, Suwanee, GA (US); Chandrasekar Rathineswaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 182 days.

(21) Appl. No.: 15/077,129

(22) Filed: Mar. 22, 2016

(65) Prior Publication Data

US 2017/0279671 A1 Sep. 28, 2017

(51) Int. Cl.
*G06F 15/177* (2006.01)
*H04L 29/08* (2006.01)
*H04Q 9/00* (2006.01)

(52) U.S. Cl.
CPC ............ *H04L 67/12* (2013.01); *H04Q 9/00* (2013.01)

(58) Field of Classification Search
CPC .................. H04L 41/0803; H04L 12/2803
USPC ....................................................... 709/220
See application file for complete search history.

(56) References Cited

U.S. PATENT DOCUMENTS

| | | | | |
|---|---|---|---|---|
| 9,094,407 | B1* | 7/2015 | Matthieu | H04L 63/10 |
| 9,420,044 | B2* | 8/2016 | Gupta | H04L 67/16 |
| 9,635,124 | B2* | 4/2017 | Profit | H04L 67/2842 |
| 2015/0074195 | A1* | 3/2015 | Mani | H04L 67/104 |
| | | | | 709/204 |
| 2015/0249672 | A1* | 9/2015 | Burns | H04L 12/66 |
| | | | | 726/4 |
| 2015/0341446 | A1* | 11/2015 | Nguyen | H04L 67/16 |
| | | | | 709/223 |
| 2016/0227371 | A1* | 8/2016 | Wang | H04W 4/005 |

* cited by examiner

*Primary Examiner* — Kristie Shingles
(74) *Attorney, Agent, or Firm* — Locke Lord LLP; Tim Tingkang Xia, Esq.

(57) ABSTRACT

Aspects of direct to systems and methods for making legacy devices Internet of Things (IoT) aware. In certain embodiments, the legacy device is connected to an IoT component, and a remote IoT device is provided to be communicatively connected to the IoT component over a network protocol. The IoT component includes a glue logic being specific to and electrically connected to the legacy device. In operation, the IoT component receives a first control signal from the remote IoT device over the network protocol, and generates a second control signal specific for the legacy device based on the first control signal. Thus, the IoT components may send the second control signal to the legacy device through the glue logic to control the legacy device, thus making the legacy device IoT aware.

20 Claims, 5 Drawing Sheets

US 9,954,954 B2

SYSTEM AND METHOD FOR MAKING LEGACY DEVICE INTERNET OF THINGS (IOT) AWARE

FIELD

The present disclosure relates generally to Internet of Things (IoT) technology, and more particularly to systems and methods for making legacy devices IoT aware.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Internet of Things (IoT) is the network of physical objects, including devices, vehicles, buildings and other items embedded with electronics, software, sensors, and network connectivity, that enables these objects to collect and exchange data. Recently, IoT devices have become very popular with its characteristics of automation and being easy to use, leaving similar legacy devices behind. Thus, manufacturers of legacy devices try to catch up to the IoT wave by making IoT aware devices. However, manufacturing new IoT or equivalent devices may require time for research and develop and major changes to the existing manufacturing process, which is generally very expensive and time consuming.

Therefore, an unaddressed need exists in the art to address the aforementioned deficiencies and inadequacies.

SUMMARY

Certain aspects of the disclosure direct to a system, which includes a legacy device, an Internet of Things (IoT) component being connected to the legacy device to make the legacy device IoT aware, and a remote IoT device communicatively connected to the IoT component over a network protocol. The remote IoT device is configured to send a first control signal to the IoT component, such that the IoT component is configured to control the legacy device based on the first control signal. In certain embodiments, the IoT component includes a processor, a glue logic being specific to and electrically connected to the legacy device, and a memory storing computer executable code. The computer executable code, when executed at the processor, is configured to: receive the first control signal from the remote IoT device over the network protocol; generate, based on the first control signal, a second control signal specific for the legacy device; and send the second control signal to the legacy device through the glue logic.

Certain aspects of the disclosure direct to a method for making a legacy device IoT aware, including: connecting an IoT component to the legacy device; and sending, from a remote IoT device communicatively connected to the IoT component over a network protocol, a first control signal to the IoT device, such that the IoT device controls the legacy device based on the first control signal. In certain embodiments, the IoT component includes a processor, a glue logic being specific to and electrically connected to the legacy device, and a memory storing computer executable code. The computer executable code, when executed at the processor, is configured to: receive the first control signal from the remote IoT device over the network protocol; generate, based on the first control signal, a second control signal specific for the legacy device; and send the second control signal to the legacy device through the glue logic.

Certain aspects of the disclosure direct to a non-transitory computer readable medium storing computer executable code. The computer executable code, when executed at a processor of an Internet of Things (IoT) component, is configured to: receive a first control signal from a remote IoT device over a network protocol, wherein the remote IoT device being configured to send the first control signal to the IoT component, and the IoT component is connected to a legacy device, such that the IoT component is configured to control the legacy device based on the first control signal to make the legacy device IoT aware; generate, based on the first control signal, a second control signal specific for the legacy device; and send the second control signal to the legacy device through a glue logic, wherein the glue logic is specific to and electrically connected to the legacy device.

In certain embodiments, the remote IoT device is a mobile device, and the network protocol is Wi-Fi protocol or Bluetooth protocol.

In certain embodiments, the legacy device includes a control component, and the glue logic of the IoT component is electrically connected to the control component of the legacy device, wherein the IoT component is configured to control the legacy device by sending the second control signal to the control component through the glue logic.

In certain embodiments, the control component includes at least one metal-oxide-semiconductor field-effect transistor (MOSFET) analog switch as a power button to control power of the legacy device, the glue logic of the IoT component comprises at least one general-purpose input/output (GPIO) line connected to the at least one MOSFET analog switch, and the first control signal is a power command. In certain embodiments, the computer executable code is configured to generate, based on the power command, a GPIO high signal as the second control signal, and send the GPIO high signal to the power button through the at least one GPIO line for turning on the power button.

In certain embodiments, the legacy device further includes a sensor component, and the glue logic of the IoT component is further electrically connected to the sensor component of the legacy device. In certain embodiments, the IoT component is further configured to receive a first sensor signal from the sensor component through the glue logic, and forward the first sensor signal to the remote IoT device.

In certain embodiments, the control component includes at least one MOSFET analog switch, which includes at least one adjustment button, and the first control signal is an adjustment command for adjusting a specific value of the legacy device. In certain embodiments, the glue logic of the IoT component includes at least one GPIO line connected to the at least one MOSFET analog switch, and at least one connection bus connected to the sensor component. In certain embodiments, the computer executable code is configured to: generate, based on the adjustment command, one or more GPIO high signals as the second control signal; send the one or more GPIO high signals to the at least one adjustment button through the at least one GPIO line for adjusting the specific value to a target value; receive the first sensor signal from the sensor component through the at least one connection bus; convert the first sensor signal to a second sensor signal specific for the remote IoT device; and send the second sensor signal to the remote IoT device over the network protocol, wherein the remote IoT device is configured to generate a sensor value based on the second sensor signal.

In certain embodiments, the legacy device is a thermostat device storing a temperature value as the specific value, the adjustment command is a temperature setting command for setting the temperature value of the thermostat to the target value, the sensor component of the thermostat device comprises a thermo-sensor component, and the at least one connection bus is an Inter-Integrated Circuit (I2C) bus or a universal asynchronous receiver/transmitter (UART) bus connected to the thermos-sensor.

In certain embodiments, the computer executable code, when executed at the processor, is configured to: receive a temperature signal as the first sensor signal from the thermo-sensor component through the glue logic; convert the temperature signal to a temperature display signal as the second sensor signal; and send the temperature display signal to the remote IoT device over the network protocol, wherein the remote IoT device is further configured to convert the temperature display signal to a current temperature value as the sensor value, and display the current temperature value.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
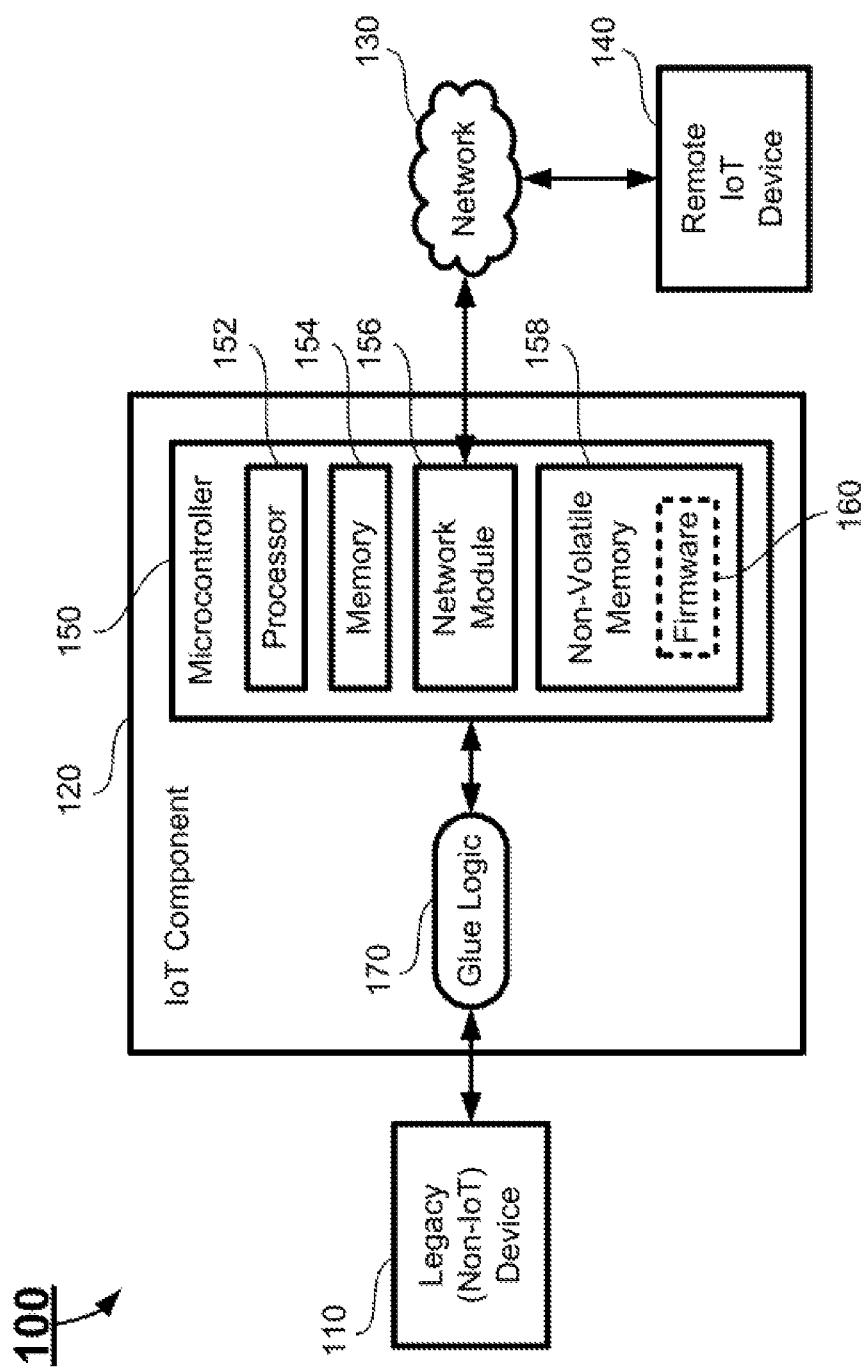
FIG. 1 schematically depicts a block diagram of a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to a system and a method for making legacy devices IoT aware. In particular, an IoT device includes one or more of the following behaviors: (a) being able to control itself based on preset configuration; (b) being able to control or monitor the device from a remote location using mobile devices; and (c) optionally being able to update data to a cloud or big data analytics. Thus, a typical IoT device should have a microcontroller and an external interface for performing external communication, such as Wi-Fi and/or Bluetooth communication. Further, a mobile device may be provided with mobile apps to access the IoT device remotely. Optionally, the IoT device may include cloud connectivity based on manufacturer's preference. In comparison, a legacy device, which is an existing non-IoT device being made without any of the IoT functionalities, does not have any of the behaviors of the IoT device. Accordingly, there is a need to make the legacy device IoT aware without significantly change the manufacturing process of the legacy device.

Certain aspects of the disclosure relate to a system for making a legacy device IoT aware. FIG. 1 schematically depicts a block diagram of a system according to certain embodiments of the present disclosure. As shown in FIG. 1, the system 100 includes a legacy device 110, and other components that make the legacy device 110 IoT aware. In particular, the components include an IoT component 120 and a remote IoT device 140 being communicatively connected to the IoT component 120 over a network 130. In certain embodiments, the network 130 may be a wireless network under a specific network protocol, and may be of various forms, such as a public network and a private network. Examples of the network protocol may include, but not limited to, Wi-Fi protocol or Bluetooth protocol.

The legacy device 110 is a non-IoT device being made without any of the IoT functionalities. In certain embodiments, the legacy device 110 may be an existing electronic device that has no IoT functionalities. For example, the legacy device 110 may be a simple electronic device that generates a simple energy output, such as heating or lighting output, in response to a simple input, such as a power input. In this case, the electronic device may include a power button to control the power input, and other circuitry components that provides the output functions. Alternatively, the legacy device 110 may be a more complex electronic device that may generate a complicated output signal in response to one or more inputs for further processing or operation of the legacy device 110. Examples of different types of the legacy device 110 will be elaborated in detail later.

The IoT component 120 is essentially a combination of components that enables the legacy device 110 to become IoT aware. As shown in FIG. 1, the IoT component 120 includes a microcontroller 150 and a glue logic 170. The microcontroller 150 provides the IoT functionalities of the IoT component 120, and the glue logic 170 is used to connect the microcontroller 150 to the legacy device 110.

The microcontroller 150 is a small system on a chip (SoC) which is generally formed with a single integrated circuit, containing a processor core, memory, and programmable input/output peripherals. Generally, the microcontroller 150 is designed in the form of a compact computer chip, which only includes necessary hardware and software components based on need. Thus, the size of the microcontroller 150 may be limited. As shown in FIG. 1, the microcontroller 150 includes a processor 152, a memory 154, a network module 156 and a volatile memory 158 storing firmware 160. In certain embodiments, however, the microcontroller 150 may include other hardware and software components not shown in FIG. 1 to perform its corresponding tasks. Examples of these hardware and software components may include, but not limited to, other required memory, interfaces, buses, Input/Output (I/O) modules and peripheral devices.

The processor 152 is the processor core of the microcontroller 150, configured to control operation of the microcontroller 150. In certain embodiments, the processor 152 may execute any computer executable code or instructions stored in the volatile memory 158 of the microcontroller, such as the firmware 160. In certain embodiments, the microcontroller 150 may run on more than one processor 152, such as two processors.

The memory 154 can be a volatile memory, such as the random-access memory (RAM), for storing the data and information during the operation of the microcontroller 150.

The network module 156 is the input/output external interface or peripheral component that connects the microcontroller 150 to the network 130. Generally, the network module 156 is controlled by the firmware 160, which is programmable to perform communication to/from the network 130 over a predefined network protocol, such as Wi-Fi or Bluetooth. For example, the remote IoT device 140 may communicate with the IoT component 130 through the network 130 over the Wi-Fi protocol or the Bluetooth protocol, and the network module 156 will receive the data from the remote IoT device 140 via the network 130 or send the data to the remote IoT device 140 via the network 130. Generally, data being transferred over the network protocol may be in a more complex format such that the network module 156 may be capable of communicating with the network 130, but not with the legacy device 110.

The non-volatile memory 158 is a non-volatile data storage media for storing the applications of the microcontroller 150. Generally, due to the size limitation of the microcontroller 150, the size of the non-volatile memory 158 may be limited to store the necessary computer executable code as the firmware 160. Examples of the non-volatile memory 158 may include flash memory, memory cards, USB drives, or any other types of data storage devices suitable for the microcontroller 150. The firmware 160 stored in the non-volatile memory 158 includes the computer executable code that may be executed at the processor 152. In certain embodiments, the firmware 160 may include one or more modules or software components that may be executed independently.

The glue logic 170 is a simple custom logic circuitry for connecting the microcontroller 150 to the legacy device 110. Generally, the glue logic 170 is used to connect or interface a number of complex logic circuits together, and the complex logic circuits being connected by the glue logic 170 may be off-the-shelf ICs or chips. Thus, the glue logic 170 may be selected based on the complexity of the logic circuits. For example, ordinary logic circuitry components may be used as the glue logic for ordinary logic circuits. In more complex cases, a complex programmable logic device (CPLD) or a field-programmable gate array (FPGA) may be used as the glue logic. In certain embodiments, when the legacy device 110 is a simple type which involves a simple power input, the glue logic 170 may be a simple general-purpose input/output (GPIO) line connected to the power input of the legacy device 110. If the legacy device 110 includes multiple inputs and outputs, the glue logic 170 may include other forms of circuits as connection buses to be connected to the inputs and outputs, such as Inter-Integrated Circuit (I2C) buses or universal asynchronous receiver/transmitter (UART) buses, or other types of connection interfaces or buses.

The remote IoT device 140 is a remote device with IoT functionalities, which functions as a user terminal such that a user may operate on the remote IoT device 140 to remotely control the IoT components 120. Examples of the remote IoT device 140 may include a desktop computer, a laptop computer, a mobile device such as a smartphone, a tablet, or any other devices with IoT functionalities. In certain embodiments, using a mobile device as an example of the remote IoT device 140, the mobile device may be installed with a specific application (hereinafter the "app") to communicate with the IoT component 120 over the network protocol (such as the Wi-Fi protocol or the Bluetooth protocol). Thus, a user may operate the app on the mobile device to generate a first control signal, and send the first control signal to the IoT component to control the operation of the legacy device 110. In certain embodiments, the app on the mobile device may receive a signal from the IoT component 120, and generate a corresponding display message based on the received signal to notify the user about information of the legacy device.

As discussed above, the legacy device 110 may be of various different types. For example, the legacy device 110 may be a simple electronic device that generates a simple energy output, such as heating or lighting output, in response to a simple input, such as a power input. In this case, the legacy device 110 may include a control component to control the input to the legacy device 110. In certain embodiments, the control component may be a power button to control the power input of the legacy device 110. Examples of such simple devices may include a crockpot, a heater, a light switch device, or any other devices that requires a power button to control the power input of the device.

Figure 2:
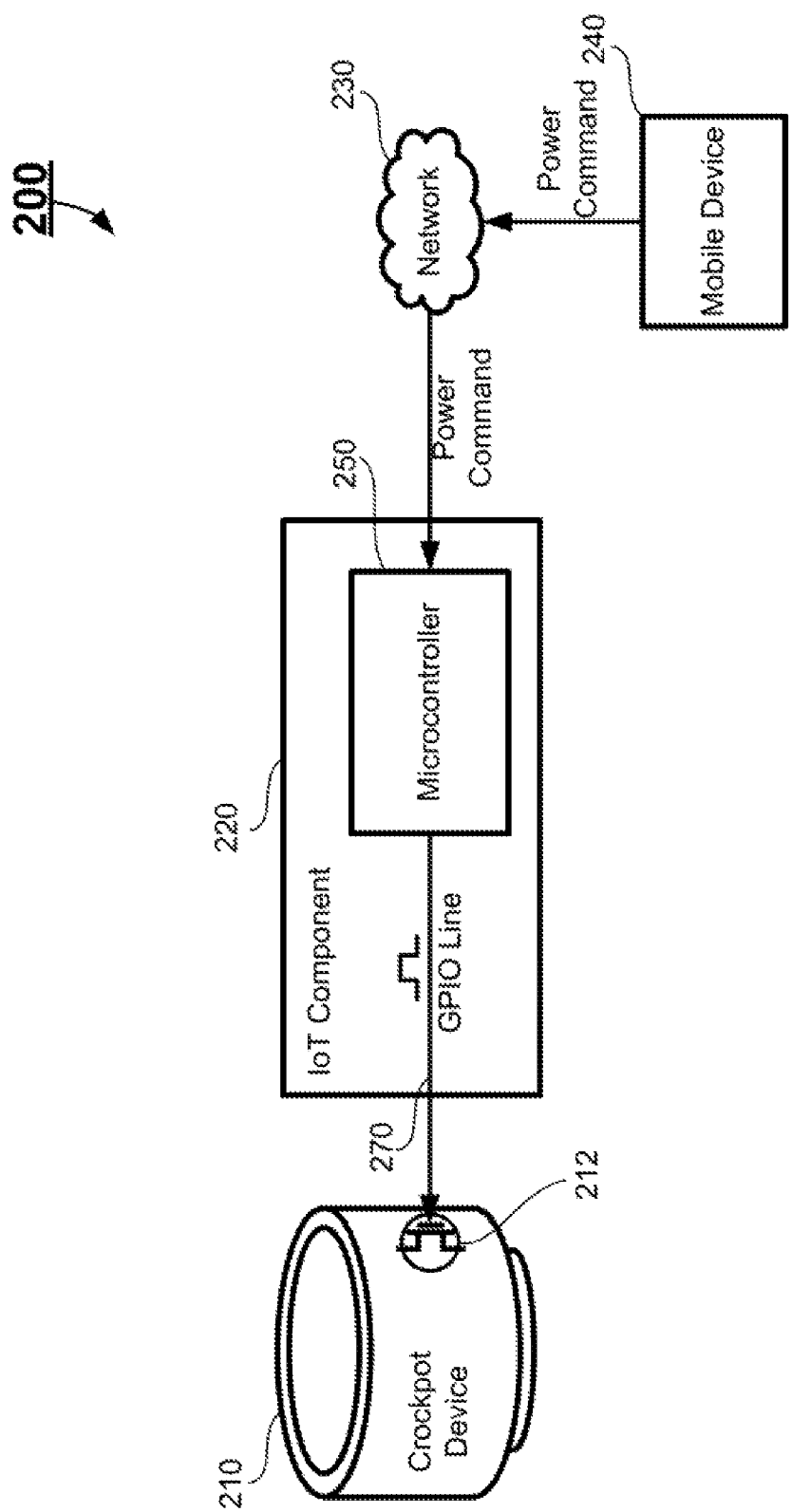
FIG. 2 schematically depicts a system including a crockpot device as the legacy device according to certain embodiments of the present disclosure.

FIG. 2 schematically depicts a system including a crockpot device as the legacy device according to certain embodiments of the present disclosure. As shown in FIG. 2, a crockpot device 210 is provided as the legacy device, which is connected to the IoT component 220. A mobile device 240, which functions as the remote IoT device, is connected to the IoT component 220 via the network 230. The crockpot device 210 includes a metal-oxide-semiconductor field-effect transistor (MOSFET) analog switch 212 as a power button of the crockpot device 210 to control the power of the crockpot. Further, the IoT component 220 includes a microcontroller 250, and a GPIO line 270 as the glue logic connecting the microcontroller 250 to the MOSFET analog switch 212 of the crockpot device 210. When IoT component 220 intends to turn on the power of the crockpot device 210, the microcontroller 250 may generate a GPIO high signal, and send the GPIO high signal to the MOSFET analog switch 212 through the GPIO line 270 to turn on the MOSFET analog switch 212, thus controlling the power of the crockpot device 210.

In operation, a user may operate the mobile device 240 (the remote IoT device) to generate a power command as a first control signal to be sent to the IoT component 220. The mobile device 240 then sends the power command to the microcontroller 250 of the IoT component 220 through the network 230. When the microcontroller 250 receives the power command, the firmware of the microcontroller 250 generates, based on the power command, a corresponding GPIO high signal as a second control signal to be sent to the crockpot device 210 (i.e., the legacy device). In other words, the microcontroller 250 converts the power command to the GPIO high signal. Upon receiving the GPIO high signal, the MOSFET analog switch 212 is turned on to provide power to the crockpot device 210.

As discussed above, the crockpot device 210 may be an existing legacy device which does not include any IoT functionalities. Thus, by adding the IoT component 220 to the crockpot device 210 and connecting the GPIO line 270 to the MOSFET analog switch 212, the crockpot device 210 may become IoT aware without any significant change of its structure. In certain embodiments, when the power button of the crockpot device 210 is not a MOSFET analog switch or any other type of switch connectable to the GPIO line 270, there is a need to replace the power button by a MOSFET analog switch 212 such that the GPIO line 270 is connectable to the power button.

It should be particularly noted that the GPIO high signal (i.e., the second control signal) is merely a pulse analog signal being transmitted through the GPIO line 270, which does not contain any additional information. In comparison, the power command (i.e., the first control signal) is transmitted through the network 230 over the network protocol, such as a Wi-Fi protocol or a Bluetooth protocol. Thus, the format of the power command may be in a more complex format, which may include additional information to control the power of the legacy device.

Figure 3:
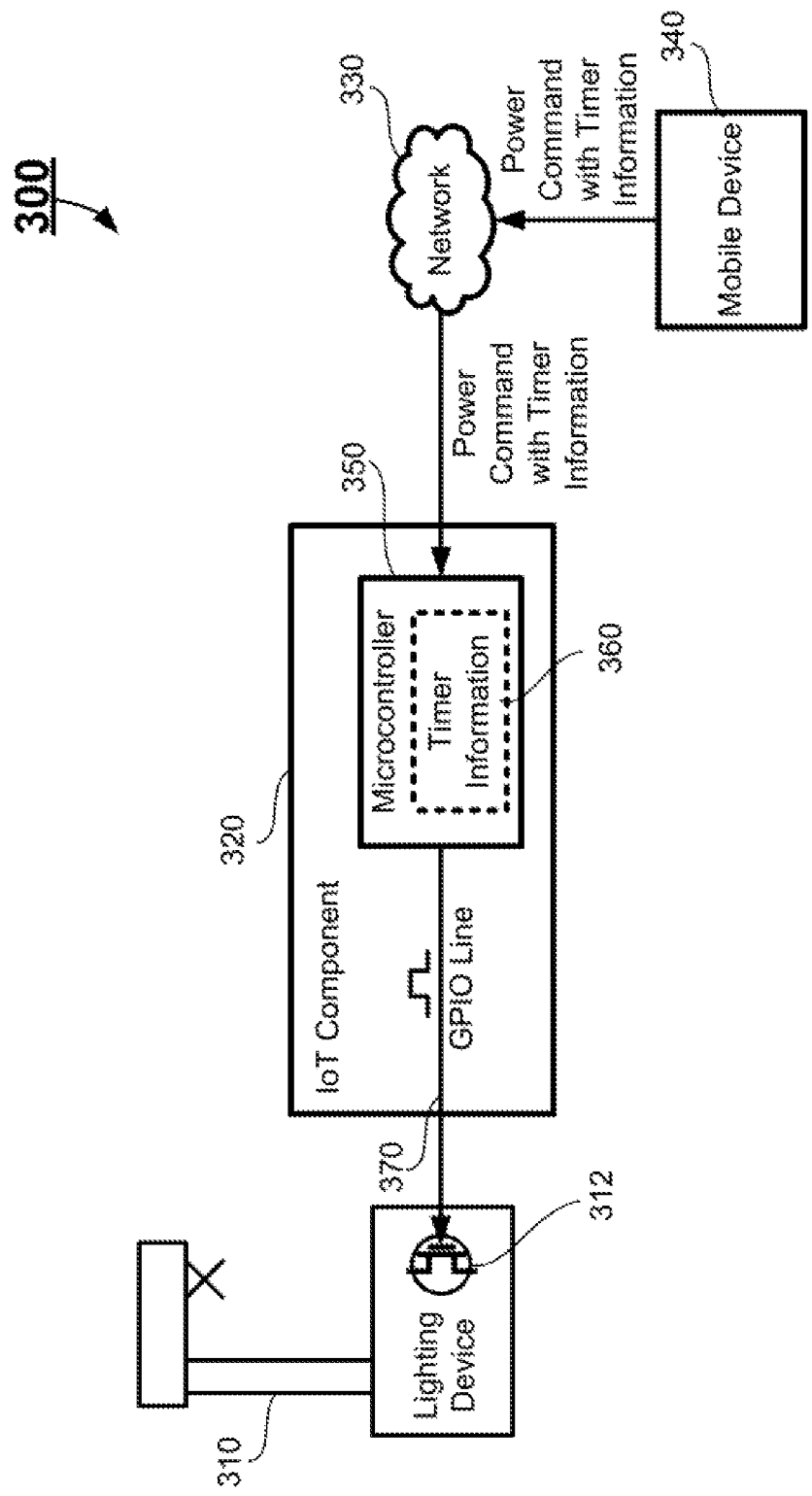
FIG. 3 schematically depicts a system including a lighting device as the legacy device according to certain embodiments of the present disclosure.

FIG. 3 schematically depicts a system including a lighting device as the legacy device according to certain embodiments of the present disclosure. As shown in FIG. 3, a lighting device 310 is provided as the legacy device, which is connected to the IoT component 320. A mobile device 340, which functions as the remote IoT device, is connected to the IoT component 320 via the network 330. The lighting device 310 includes a MOSFET analog switch 312 as a power button of the lighting device 310 to control the power of the light. Further, the IoT component 320 includes a microcontroller 350, and a GPIO line 370 as the glue logic connecting the microcontroller 350 to the MOSFET analog switch 312 of the lighting device 310. When IoT component 320 intends to turn on the power of the lighting device 310, the microcontroller 350 may generate a GPIO high signal, and send the GPIO high signal to the MOSFET analog switch 312 through the GPIO line 370 to turn on the MOSFET analog switch 312, thus controlling the power of the crockpot device 310.

It should be particularly noted that, since the lighting device 310 is a legacy device, the lighting device 310 may not have a timer to perform a power on/off process based on a set timer. In other words, the lighting device 310, as a legacy device itself, is only operable to turn on/off the light by the power button. However, by adding the IoT component 320, the lighting device 310 may be converted to a timer-controlled light device by programming the firmware of the microcontroller 350 of the IoT component 320.

In operation, a user may operate the mobile device 340 (the remote IoT device) to generate a power command as a first control signal to be sent to the IoT component 320. The power command may include a power instruction to turn the power on/off. Additionally, the power command may further include timer information for setting a timer for the power instruction to be performed. In other words, the timer information will set a designated time, and the power instruction will not be performed until the designated time. The mobile device 340 then sends the power command to the microcontroller 350 of the IoT component 320 through the network 330. When the microcontroller 350 receives the power command, the firmware of the microcontroller 350 generates, based on the power command, a corresponding timer information based on the timer information of the power command, and store the timer information 360 in the memory of the microcontroller 350. Thus, the microcontroller 350 does nothing until the designated time indicated by the timer information 360 arrives. At the designated time, the microcontroller 350 may generate a corresponding GPIO high signal as a second control signal to be sent to the lighting device 310 (i.e., the legacy device). In other words, the microcontroller 350 converts the power command to the GPIO high signal at the designated time indicated by the timer information 360. Upon receiving the GPIO high signal, the MOSFET analog switch 312 is turned on to provide power to the lighting device 310. In this case, the lighting device 310 becomes a timer-controlled lighting device with the IoT functionalities provided by the IoT component 320.

As discussed above, the lighting device 310 may be an existing legacy device which does not include any IoT functionalities, such as the communication capabilities and the timer controlled capabilities. Thus, by adding the IoT component 320 to the lighting device 310 and connecting the GPIO line 370 to the MOSFET analog switch 312, the lighting device 310 may become IoT aware without any significant change of its structure. In certain embodiments, when the power button of the lighting device 310 is not a MOSFET analog switch or any other type of switch connectable to the GPIO line 370, there is a need to replace the power button by a MOSFET analog switch 312 such that the GPIO line 370 is connectable to the power button.

In certain embodiments, the legacy device may be a more complex electronic device, which may generate complicated output signals in response to one or more inputs for further processing or operation of the legacy device. For example, a thermostat device is a temperature sensitive component which detects or senses the temperature of a system, and controls a heating or cooling device to maintain the system temperature at a desired target temperature. Specifically, the thermostat device may include a control component, which is used to adjust the target temperature, and a sensor component, which is used to detect or sense a temperature signal. Further, the thermostat device may store a temperature value as a specific value (e.g., a current temperature value), and compare the temperature value to the target value to determine whether heating or cooling is required to adjust the temperature to the target value. Many of the existing thermostat devices are legacy devices without IoT functionalities, and may be used in the system to become IoT aware without any significant change of its structure.

Figure 4:
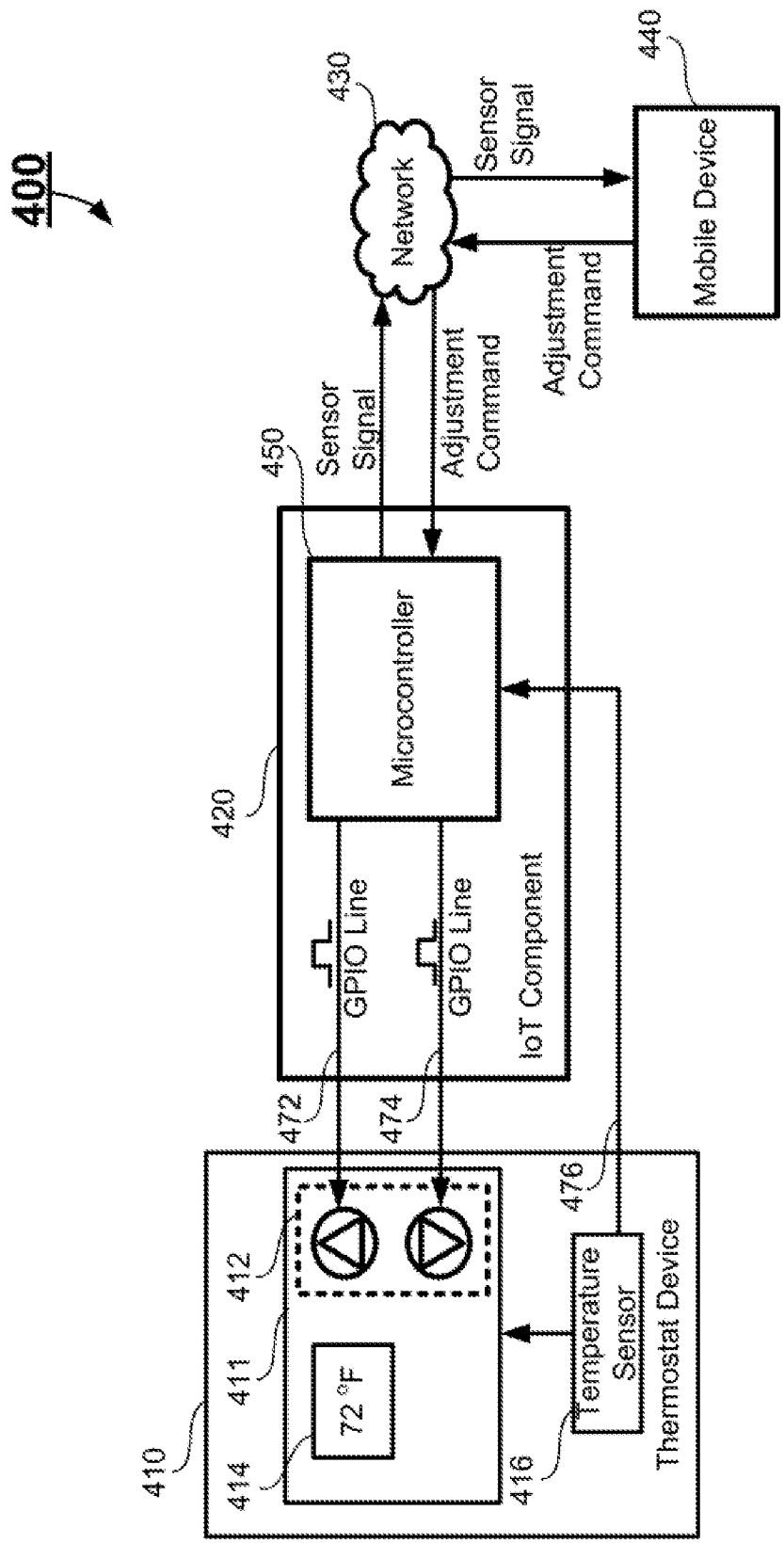
FIG. 4 schematically depicts a system including a thermostat device as the legacy device according to certain embodiments of the present disclosure.

FIG. 4 schematically depicts a system including a thermostat device as the legacy device according to certain embodiments of the present disclosure. As shown in FIG. 4, a thermostat device 410 is provided as the legacy device, which is connected to the IoT component 420. A mobile device 440, which functions as the remote IoT device, is connected to the IoT component 420 via the network 430. The thermostat device 410 includes a control panel 411 and a temperature sensor 416 as a sensor component. On the control panel 411, two MOSFET analog switches 412 are provided as temperature adjustment buttons of the thermostat device 410 to control the temperature adjustment functions, and a display panel 414 is provided to display the temperature being detected by the temperature sensor 416. Further, the IoT component 420 includes a microcontroller 450, two GPIO lines 472 and 474 respectively connecting the microcontroller 450 to the two MOSFET analog switches 412 of the thermostat device 410, and a connection bus 476 connecting the microcontroller 450 to the temperature sensor 416 of the thermostat device 410. In certain embodiments, the connection bus 476 may be an I2C bus or a UART bus.

In certain embodiments, when IoT component 420 intends to adjust the target temperature of the thermostat device 410, the microcontroller 450 may generate one or more GPIO high signals corresponding to one of the two MOSFET analog switches 412, and send the GPIO high signals to the corresponding MOSFET analog switch 412 through the GPIO line 472 or 474 to turn on the corresponding MOSFET analog switch 412, thus adjustment the temperature. For example, as shown in FIG. 4, the temperature is shown as 72° F. If the microcontroller 450 intends to adjust the temperature to a target temperature of 68° F., the microcontroller 450 may generate four GPIO high signals, and send the four GPIO high signals respectively to the bottom MOSFET analog switch 412 (which has a down arrow, indicating the temperature going down), in order to adjust the temperature 4 degrees down from 72° F. to the target temperature of 68° F.

In operation, a user may operate the mobile device 440 (the remote IoT device) to generate an adjustment command as a first control signal to be sent to the IoT component 420. In certain embodiments, the adjustment command may include an instruction to indicate a target temperature. Optionally, the adjustment command may further include timer information for setting a timer for the power instruction to be performed. In other words, the timer information will set a designated time, and the adjustment instruction will not be performed until the designated time. The mobile device 440 then sends the adjustment command to the microcontroller 450 of the IoT component 420 through the network 430. When the microcontroller 450 receives the adjustment command, the firmware of the microcontroller 450 generates, based on the adjustment command, one or more corresponding GPIO high signals as the second control signal to be sent to the thermostat device 410 (i.e., the legacy device). Optionally, if the adjustment command includes the timer information, the microcontroller 450 may generate a corresponding timer information based on the timer information, and store the timer information in the memory of the microcontroller 450. Thus, the microcontroller 450 does nothing until the designated time indicated by the timer information arrives. At the designated time, the microcontroller 450 may then generate the corresponding GPIO high signals. In other words, the microcontroller 450 converts the adjustment command to the GPIO high signal at the designated time indicated by the timer information. Once the GPIO high signal is generated, the microcontroller 450 sends the GPIO high signal to the corresponding adjustment buttons 412 of the thermostat device 410. Upon receiving the GPIO high signal, the corresponding MOSFET analog switch 412 is turned on to adjust the temperature, thus setting the target temperature of the thermostat device 410. In this case, the thermostat device 410 becomes an IoT aware device with the IoT functionalities provided by the IoT component 420.

On the other hand, when the microcontroller 450 receives a sensor signal (i.e., a first sensor signal) from the temperature sensor 416 through the connection bus 476, the microcontroller 450 may convert the sensor signal to a different signal (i.e., a second sensor signal) in a different format, which is specific for the transmission to the mobile device 440 over the network protocol. Then the microcontroller 450 may send the converted sensor signal (i.e., the second sensor signal) to the mobile device 440 over the network protocol, such that the mobile device 440 may generate a sensor value (in this case a temperature value) based on the second sensor signal, and display the sensor value to the user.

Figure 5A:
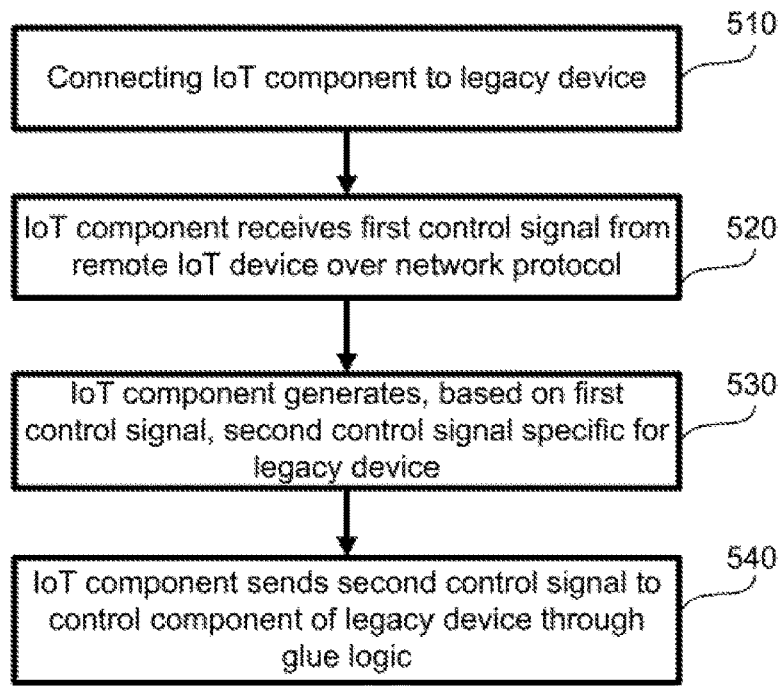
FIGS. 5A and 5B depict flowchart of the operation of the system according to certain embodiments of the present disclosure.
Figure 5B:
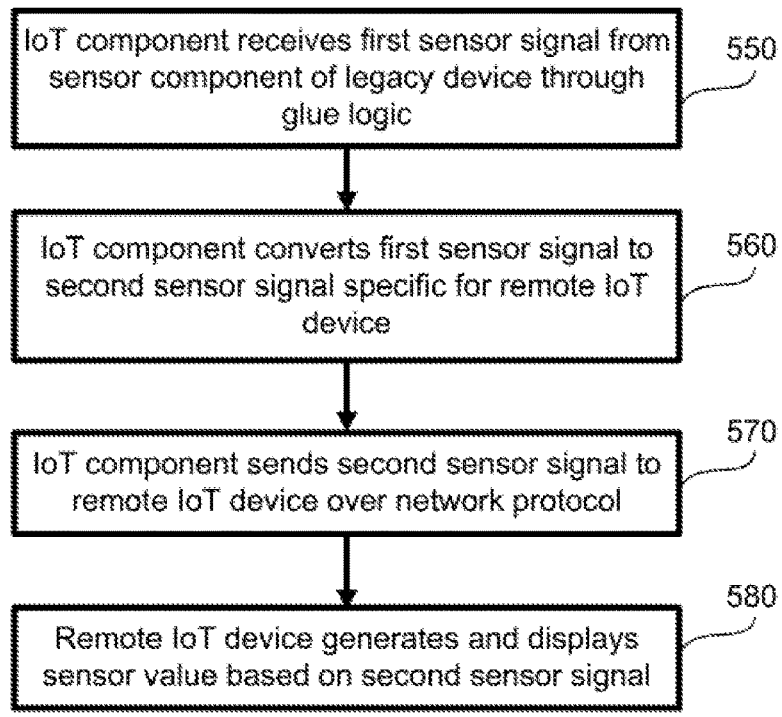

FIGS. 5A and 5B depict flowchart of the operation of the system according to certain embodiments of the present disclosure. In certain embodiments, the methods of the operation of the system may be implemented by a system to enable the legacy device to become IoT aware, which may be any of the systems as shown in FIGS. 1-4.

Referring to FIG. 5A, using the system 100 as shown in FIG. 1 as an example, at procedure 510, the IoT component 120 is connected to the legacy device 110, such that the legacy device 110 becomes IoT aware. At procedure 520, the IoT component 120 receives the first control signal from the remote IoT device 140 over the network protocol. At procedure 530, the IoT component 120 generates, based on the first control signal, a second control signal specific for the legacy device 110. At procedure 540, the IoT component 120 sends the second control signal to the control component of the legacy device 110 through the glue logic 170 to control the legacy device 110.

Referring to FIG. 5B, using the system 400 as shown in FIG. 4 as another example, at procedure 550, the IoT component 420 receives the first sensor signal from the sensor component 416 through the glue logic (i.e., the connection bus 476). At procedure 560, the IoT component 420 converts the first sensor signal to a second sensor signal specific for the remote IoT device 440 (i.e., the mobile device). At procedure 570, the IoT component 420 sends the second sensor signal to the remote IoT device 440 over the network protocol. At procedure 580, upon receiving the second sensor signal, the remote IoT device 440 generates and displays a sensor value based on the second sensor signal.

In a further aspect, the present disclosure is related to a non-transitory computer readable medium storing computer executable code. The code, when executed at a processor of an IoT component, may perform the method as described above. In certain embodiments, the non-transitory computer readable medium may include, but not limited to, any physical or virtual storage media storing the firmware of the microcontroller of the IoT component. In certain embodiments, the non-transitory computer readable medium may be implemented as the non-volatile memory 158 of the microcontroller 150 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a legacy device, comprising a control component, wherein the control component comprises at least one metal-oxide-semiconductor field-effect transistor (MOSFET) analog switch;
an Internet of Things (IoT) component being connected to the legacy device to make the legacy device IoT aware; and
a remote IoT device communicatively connected to the IoT component over a network protocol, the remote IoT device being configured to send a first control signal to the IoT component, such that the IoT component is configured to control the legacy device based on the first control signal;
wherein the IoT component comprises:
a processor;
a glue logic being specific to and electrically connected to the control component of the legacy device, wherein the glue logic comprises at least one general-purpose input/output (GPIO) line connected to the at least one MOSFET analog switch of the control component of the legacy device; and
a memory storing computer executable code;
wherein the computer executable code, when executed at the processor, is configured to:
receive the first control signal from the remote IoT device over the network protocol;
generate, based on the first control signal, a second control signal specific for the legacy device; and
send the second control signal to the legacy device through the glue logic.

2. The system as claimed in claim 1, wherein the remote IoT device is a mobile device, and the network protocol is Wi-Fi protocol or Bluetooth protocol.

3. The system as claimed in claim 1, wherein the IoT component is configured to control the legacy device by sending the second control signal to the control component through the glue logic.

4. The system as claimed in claim 3, wherein the at least one MOSFET analog switch functions as a power button to control power of the legacy device, the first control signal is a power command, and the computer executable code is configured to:
generate, based on the power command, a GPIO high signal as the second control signal; and
send the GPIO high signal to the power button through the at least one GPIO line for turning on the power button.

5. The system as claimed in claim 3, wherein the legacy device further comprises a sensor component, and the glue logic of the IoT component is further electrically connected to the sensor component of the legacy device, wherein the IoT component is further configured to receive a first sensor signal from the sensor component through the glue logic, and forward the first sensor signal to the remote IoT device.

6. The system as claimed in claim 5, wherein:
the at least one MOSFET analog switch comprises at least one adjustment button, and the first control signal is an adjustment command for adjusting a specific value of the legacy device;
the glue logic of the IoT component further comprises at least one connection bus connected to the sensor component;
wherein the computer executable code is configured to:
generate, based on the adjustment command, one or more GPIO high signals as the second control signal;
send the one or more GPIO high signals to the at least one adjustment button through the at least one GPIO line for adjusting the specific value to a target value;
receive the first sensor signal from the sensor component through the at least one connection bus;
convert the first sensor signal to a second sensor signal specific for the remote IoT device; and
send the second sensor signal to the remote IoT device over the network protocol, wherein the remote IoT device is configured to generate a sensor value based on the second sensor signal.

7. The system as claimed in claim 6, wherein the legacy device is a thermostat device storing a temperature value as the specific value, the adjustment command is a temperature setting command for setting the temperature value of the thermostat to the target value, the sensor component of the thermostat device comprises a thermo-sensor component, and the at least one connection bus is an Inter-Integrated Circuit (I2C) bus or a universal asynchronous receiver/transmitter (UART) bus connected to the thermos-sensor.

8. The system as claimed in claim 7, wherein the computer executable code, when executed at the processor, is configured to:
receive a temperature signal as the first sensor signal from the thermo-sensor component through the glue logic;
convert the temperature signal to a temperature display signal as the second sensor signal; and
send the temperature display signal to the remote IoT device over the network protocol, wherein the remote IoT device is further configured to convert the temperature display signal to a current temperature value as the sensor value, and display the current temperature value.

9. A method for making a legacy device Internet of Things (IoT) aware, comprising:
connecting an IoT component to the legacy device, wherein the legacy device comprises a control component comprising at least one metal-oxide-semiconductor field-effect transistor (MOSFET) analog switch, and the IoT component comprises:
a processor;
a glue logic being specific to and electrically connected to the control component of the legacy device, wherein the glue logic comprises at least one general-purpose input/output (GPIO) line connected to the at least one MOSFET analog switch of the control component of the legacy device; and
a memory storing computer executable code; and
sending, from a remote IoT device communicatively connected to the IoT component over a network protocol, a first control signal to the IoT device, such that the IoT device controls the legacy device based on the first control signal;
wherein the computer executable code, when executed at the processor, is configured to:
receive the first control signal from the remote IoT device over the network protocol; and
generate, based on the first control signal, a second control signal specific for the legacy device; and
send the second control signal to the legacy device through the glue logic.

10. The method as claimed in claim 9, wherein the IoT component is configured to control the legacy device by sending the second control signal to the control component through the glue logic.

11. The method as claimed in claim 10, wherein the at least one MOSFET analog switch functions as a power button to control power of the legacy device, and the first control signal is a power command, wherein the computer executable code is configured to generate, based on the power command, a GPIO high signal as the second control signal, and send the GPIO high signal to the power button through the at least one GPIO line for turning on the power button.

12. The method as claimed in claim 10, wherein the legacy device further comprises a sensor component, and the glue logic of the IoT component is further electrically connected to the sensor component of the legacy device, wherein the IoT component is further configured to receive a first sensor signal from the sensor component through the glue logic, and forward the first sensor signal to the remote IoT device.

13. The method as claimed in claim 12, wherein:
at least one MOSFET analog switch comprises at least one adjustment button, and the first control signal is an adjustment command for adjusting a specific value of the legacy device;
the glue logic of the IoT component further comprises at least one connection bus connected to the sensor component;
wherein the computer executable code is configured to:
generate, based on the adjustment command, one or more GPIO high signals as the second control signal;
send the one or more GPIO high signals to the at least one adjustment button through the at least one GPIO line for adjusting the specific value to a target value;
receive the first sensor signal from the sensor component through the at least one connection bus;
convert the first sensor signal to a second sensor signal specific for the remote IoT device; and
send the second sensor signal to the remote IoT device over the network protocol, wherein the remote IoT device is configured to generate a sensor value based on the second sensor signal.

14. The method as claimed in claim 13, wherein the legacy device is a thermostat device storing a temperature value as the specific value, the adjustment command is a temperature setting command for setting the temperature value of the thermostat to the target value, the sensor component of the thermostat device comprises a thermo-sensor component, and the at least one connection bus is an Inter-Integrated Circuit (I2C) bus or a universal asynchronous receiver/transmitter (UART) bus connected to the thermos-sensor, wherein the computer executable code, when executed at the processor, is configured to:

receive a temperature signal as the first sensor signal from the thermo-sensor component through the glue logic;

convert the temperature signal to a temperature display signal as the second sensor signal; and send the temperature display signal to the remote IoT device over the network protocol, wherein the remote IoT device is further configured to convert the temperature display signal to a current temperature value as the sensor value, and display the current temperature value.

15. A non-transitory computer readable medium storing computer executable code, wherein the computer executable code, when executed at a processor of an Internet of Things (IoT) component, is configured to:

receive a first control signal from a remote IoT device over a network protocol, wherein the remote IoT device being configured to send the first control signal to the IoT component, and the IoT component is connected to a legacy device comprising a control component, such that the IoT component is configured to control the legacy device based on the first control signal to make the legacy device IoT aware, wherein the control component comprises at least one metal-oxide-semiconductor field-effect transistor (MOSFET) analog switch;

generate, based on the first control signal, a second control signal specific for the legacy device; and send the second control signal to the legacy device through a glue logic, wherein the glue logic is specific to and electrically connected to the control component of the legacy device, wherein the glue logic comprises at least one general-purpose input/output (GPIO) line connected to the at least one MOSFET analog switch of the control component of the legacy device.

16. The non-transitory computer readable medium as claimed in claim 15, wherein the IoT component is configured to control the legacy device by sending the second control signal to the control component through the glue logic.

17. The non-transitory computer readable medium as claimed in claim 16, wherein the at least one MOSFET analog switch functions as a power button to control power of the legacy device, and the first control signal is a power command, wherein the computer executable code is configured to generate, based on the power command, a GPIO high signal as the second control signal, and send the GPIO high signal to the power button through the at least one GPIO line for turning on the power button.

18. The non-transitory computer readable medium as claimed in claim 17, wherein the legacy device further comprises a sensor component, and the glue logic of the IoT component is further electrically connected to the sensor component of the legacy device, wherein the IoT component is further configured to receive a first sensor signal from the sensor component through the glue logic, and forward the first sensor signal to the remote IoT device.

19. The non-transitory computer readable medium as claimed in claim 18, wherein:

the at least one MOSFET analog switch comprises at least one adjustment button, and the first control signal is an adjustment command for adjusting a specific value of the legacy device;

the glue logic of the IoT component further comprises at least one connection bus connected to the sensor component;

wherein the computer executable code is configured to:

generate, based on the adjustment command, one or more GPIO high signals as the second control signal;

send the one or more GPIO high signals to the at least one adjustment button through the at least one GPIO line for adjusting the specific value to a target value;

receive the first sensor signal from the sensor component through the at least one connection bus;

convert the first sensor signal to a second sensor signal specific for the remote IoT device; and send the second sensor signal to the remote IoT device over the network protocol, wherein the remote IoT device is configured to generate a sensor value based on the second sensor signal.

20. The non-transitory computer readable medium as claimed in claim 19, wherein the legacy device is a thermostat device storing a temperature value as the specific value, the adjustment command is a temperature setting command for setting the temperature value of the thermostat to the target value, the sensor component of the thermostat device comprises a thermo-sensor component, and the at least one connection bus is an Inter-Integrated Circuit (I2C) bus or a universal asynchronous receiver/transmitter (UART) bus connected to the thermos-sensor, wherein the computer executable code, when executed at the processor, is configured to:

receive a temperature signal as the first sensor signal from the thermo-sensor component through the glue logic;

convert the temperature signal to a temperature display signal as the second sensor signal; and send the temperature display signal to the remote IoT device over the network protocol, wherein the remote IoT device is further configured to convert the temperature display signal to a current temperature value as the sensor value, and display the current temperature value.

* * * * *